No. 883,185. PATENTED MAR. 31, 1908.
S. D. FELSING.
BELT GUIDE.
APPLICATION FILED MAY 17, 1906.

Witnesses:
C. O. Sturvey
Wm. P. Bond

Inventor:
Samuel D. Felsing
by Peirce & Fisher
Attys.

UNITED STATES PATENT OFFICE.

SAMUEL D. FELSING, OF CROOKSTON, MINNESOTA, ASSIGNOR TO THE MAPLEBAY WIND STACKER COMPANY, OF CROOKSTON, MINNESOTA, A CORPORATION.

BELT-GUIDE.

No. 883,185.  Specification of Letters Patent.  Patented March 31, 1908.

Application filed May 17, 1906. Serial No. 317,354.

*To all whom it may concern:*

Be it known that I, SAMUEL D. FELSING, a citizen of the United States, and a resident of Crookston, county of Polk, and State of Minnesota, have invented certain new and useful Improvements in Belt-Guides, of which the following is declared to be a specification.

The improvement relates to guides for the drive belts for threshing and other similar machinery which are usually driven by means of an endless belt from a traction or other portable engine set at some distance from the machine.

The invention seeks to provide an attachment which may be suitably mounted on the threshing or other similar machine by which the belt will be properly guided onto the drive pulley of the machine, even though the driving pulley of the engine may be somewhat out of line with the pulley on the machine. The attachment obviates the difficulty of placing the engine and machine exactly in line and furthermore prevents the lateral displacement of the belt by the wind.

The invention consists in the features of construction, combinations and arrangements of parts hereinafter set forth, illustrated in the accompanying drawing and more particularly pointed out in the appended claims.

Figure 1:
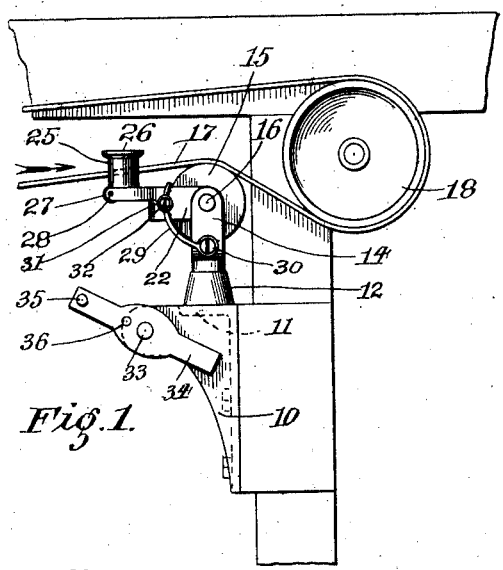
Figure 2:
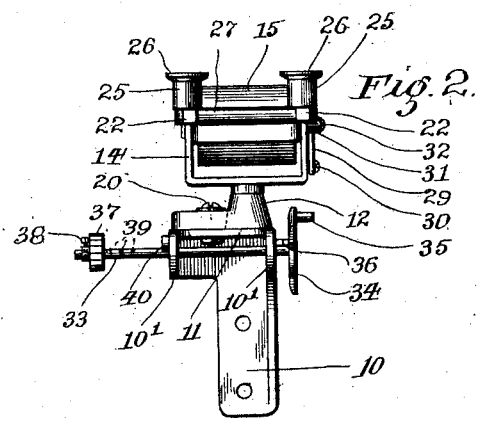
Figure 3:
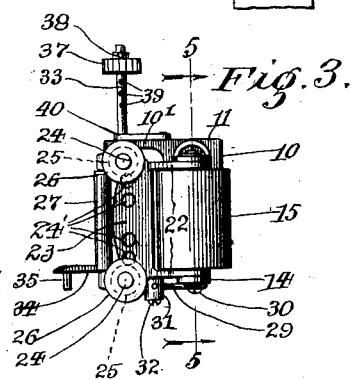
Figure 4:
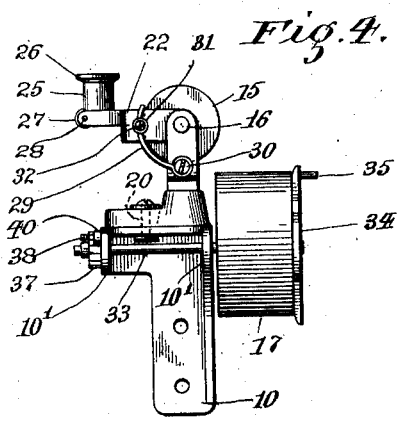
Figure 5:
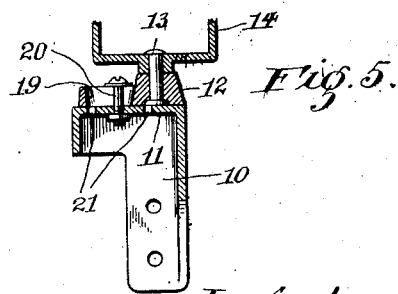

In the drawings, Figure 1 is a side view of the improved attachment showing the drive pulley of a threshing or like machine, and a portion of the drive belt. Fig. 2 is a front view of the attachment. Fig. 3 is a plan view thereof. Fig. 4 is a view similar to Fig. 2 showing the attachment in use as a belt reel. Fig. 5 is a detail section on the line 5—5 of Fig. 3.

The improved attachment comprises a suitable bracket or supporting member 10 which is adapted to be bolted in upright position on the frame of the machine. At its upper edge the bracket is provided with a horizontal off-set ledge 11 upon which is mounted a socket member 12. The socket member 12 is provided at one end with a boss within which is journaled the upright spindle or pivot pin 13. At its upper end the pivot pin or spindle 13 carries the U-shaped idler frame or carrier 14. The idler pulley 15 is journaled in the carrier or frame 14 upon a shaft 16 extending between the side arms of the frame. Pulley shaft 16 is at right angles with the spindle or pivot pin 13.

The drive belt 17 (see Fig. 1) passes over the idler pulley 15 of the guiding attachment and onto the drive pulley 18 of the machine. The socket member 12 is provided with a cross slot 19 (see Fig. 5) through which a securing bolt 20 extends. The lower end of the bolt may be set within any one of a series of holes 21 upon a horizontal ledge 11 of the bracket 10. By this means the socket member 12 is adjustably secured to the bracket and may be placed thereon in proper position to hold the idler pulley 15 in exact line with the drive pulley 18.

A pair of arms 22 are pivoted at their inner ends upon the cross shaft 16 of the idler frame between the ends of the pulley 15 and the side arms of the frame. At their outer ends the arms 22 are connected by a transverse, flat bar 23 and are provided with upwardly projecting pins or pintles 24 upon which a pair of guide rolls 25 are journaled. These rolls are preferably provided at their upper ends with projecting flanges 26. A roller 27 of small diameter is also preferably journaled between the outer ends of the arms 22 and outside of the cross bar 23 upon a cross pintle 28. The pintles 24 may be set in different holes 24' to accommodate belts of different widths.

A curved or segment shaped arm 29 is secured by a screw 30 to one of the side arms of the idler frame 14 below the shaft 16, and this arm 29 extends through an off-set lug 31 on the side of the adjacent arm 22. A set screw 32 threaded through the lug 31, engages the arm 29 and holds the swinging arms 22 and guide rolls carried thereby in desired adjusted position. The curved supporting arm 29 is concentric with the shaft 16 upon which the side arms 22 are pivoted.

The belt as shown, passes over the horizontal guide roll 27 and between the vertical guide rolls 25, but below the flanges 26 thereon; thence the belt passes over the idler pulley 15 and around the drive pulley 18 of the machine. If the engine pulley is not exactly in line with the drive pulley 18 or if the belt is blown to one side by the wind the engagement of the edges of the belt with the guide pulleys 25 will so turn the idler pulley 15 that the belt will nevertheless be properly guided onto the drive pulley 18, and any tendency of the belt to shift laterally off of the pulley 18 will be overcome. The roller 27 below the belt and the flanges 26 on the rollers 25 prevent the displacement of the belt from between the guide rollers. The arms 22 carrying the guide rollers may be adjusted in position so as to properly engage the belt without wear as it passes over the idler pulley 15, even though the engine and machine are on different levels. That is to say, the guide rolls may be adjusted to properly engage the belt when the latter passes over the guide pulley at different angles to the axis of the pulley frame.

The bracket 10 is provided with a pair of forwardly extending arms 10' between the outer ends of which is journaled a reel shaft
33. The shaft is mounted to slide longitudinally through the arms 10' and is provided on one end with a cross arm 34 having a pin or handle 35 by which the reel may be rotated. The arm 34 is also provided on its inner face with a pin or stud 36 on which the end of the belt may be hooked. A ratchet 37 is secured to the opposite end of the belt reel shaft 33 by a pin 38 which is arranged to engage any one of a series of holes 39 in the reel shaft. When the reel shaft is shifted laterally from the position shown in Fig. 2 to that shown in Fig. 4, the ratchet wheel 37 on the shaft will be brought against one of the side arms 10' of the bracket and a holding dog 40 upon the side arm will engage the ratchet.

When the belt reel is not in use it is pushed in out of the way, as shown in Fig. 2. When it is desired to wind the belt on the reel, the ratchet 37 is so adjusted on the reel shaft 33 that the latter may be drawn out sufficiently to space the cross bar 34 at a distance from the side of the bracket 10 equal to the width of the belt. The end of the belt is then hooked at the end of the stud 36 and wound up by rotating the reel. When the belt is in position it prevents the lateral movement of the reel shaft so that the ratchet 37 is held in engagement with the dog 40 and the latter will prevent the unwinding of the belt until it is lifted from engagement with the ratchet.

It is obvious that numerous changes may be made in the details of structure set forth without departure from the essentials of the invention as defined in the claims.

Having described my invention, what I claim as new and desire to secure by Letters Patent is:—

1. In an automatic belt guide, the combination with a suitable bracket, of a pulley frame journaled to swing freely in said bracket, a pulley adapted to receive a flat belt journaled in said frame, the axes of said frame and pulley being in the same plane but at right angles to each other, a pair of guide members mounted on said swinging pulley frame and arranged at one side of said pulley frame and out of line with the axis of said frame and engaging the edges of the belt at a point in advance of said pulley, whereby the pressure of the belt against one or the other of said guide members will shift said pulley frame and pulley, said guide members being adjustable on said pulley frame about the axis of the pulley, whereby they will properly engage the edges of the belt when the latter passes on to the pulley at different angles to the axis of the pulley frame and means for securing said guide members in adjusted position on said pulley frame, substantially as described.

2. In an automatic belt guide, the combination with a suitable bracket, of a pulley frame journaled in said bracket, a pulley adapted to receive a flat belt journaled in said frame, the axes of said pulley and said frame lying in the same plane but at right angles to each other, a support mounted on said swinging pulley frame and projecting laterally therefrom, a pair of guide rolls journaled on said support at one side of said pulley and at right angles to the axis thereof, said guide rolls being arranged to engage the opposite side edges of the belt at a point in advance of said pulley, said support and the guide rolls journaled thereon being adjustable on said swinging pulley frame about the axis of said pulley, whereby the guide rolls will properly engage the edges of the belt when the latter passes onto the pulley at different angles to the axis of the pulley frame and means for securing the said support in adjusted position upon said pulley frame, substantially as described.

3. A belt guide comprising a suitable bracket, a pulley frame journaled to swing freely in said bracket, a pulley adapted to receive a flat belt journaled in said frame at right angles to the axis thereof, a pair of connected arms pivotally mounted at their inner ends upon the shaft of said pulley, means adjustably connecting said arms to the pulley frame and guide rolls mounted on said arms at one side of said pulley and arranged to engage the opposite edges of the belt in advance of said pulley, whereby the pressure of the belt upon one or the other of said guide rolls will automatically shift said pulley frame and pulley, substantially as described.

4. A belt guide comprising a suitable bracket, a pulley frame pivoted on said bracket, a pulley journaled in said frame, a pair of arms connected at their outer ends and pivoted at their inner ends upon the shaft of said pulley, guide rolls journaled on the outer ends of said arms for engaging the edges of the belt, and means for adjustably connecting said arms to the pulley frame comprising a curved arm concentric with the pulley shaft fixed at one end to one of said parts and adjustably secured to the other of said parts.

5. In an automatic belt guide, the combination with a suitable bracket, of a pulley frame journaled to swing freely upon a vertical axis in said bracket, a pulley adapted to receive a flat belt journaled in said frame upon a horizontal axis, the axes of said frame and said pulley being arranged in the same vertical plane, a pair of connected supporting arms secured to and laterally projecting from said frame, guide rolls journaled on vertical axes on the outer ends of said arms and arranged to engage the opposite edges of the belt, said rolls having flanges at their upper ends above the belt, a horizontal cross roll journaled between the ends of said arms and arranged to extend beneath the belt, said guide rolls and said horizontal cross roll being arranged at one side of said pulley to engage the belt at a point in advance of the pulley, said arms and said guide rolls carried thereby being adjustable on said pulley frame in vertical direction to properly engage the belt when the latter passes to the pulley at different angles to the axis of the pulley frame and means for securing said supporting arms in adjusted position on said swinging pulley frame, substantially as described.

6. In an automatic belt guide, the combination with a suitable bracket, of a pulley frame journaled to swing freely on a vertical axis in said bracket, a pulley adapted to engage a flat belt journaled in said frame upon a horizontal axis, a support mounted on and laterally projecting from said swinging pulley frame and a pair of guide rolls journaled on vertical axes on the outer end of said support at one side of said pulley to engage the opposite edges of the belt at a point in advance of the pulley, said support being adjustable on said pulley frame in vertical direction, whereby the guide rolls will properly engage the belt when it passes on to said pulley at different angles to the axis of the pulley frame and said guide rolls being laterally adjustable upon said support to properly engage belts of different widths, substantially as described.

7. A belt guide comprising a suitable bracket, a pulley frame journaled to swing freely in said bracket, a pulley adapted to receive a flat belt journaled in said frame at right angles to the axis thereof, a pair of arms pivotally mounted at their inner ends upon the shaft of said pulley, a pair of guide rolls for engaging the edges of the belt journaled on the outer ends of said arms, a cross roll journaled between the ends of said arms and arranged to extend beneath the belt, said guide rolls and said cross roll being arranged at one side of said pulley and at one side of the axis of said pulley frame, whereby the lateral pressure of the belt against one or the other of said guide rolls will automatically shift said pulley frame and pulley and means for adjustably connecting said arms to the pulley frame, substantially as described.

8. A belt guide comprising a suitable bracket, a pulley frame journaled to swing freely in said bracket, a pulley journaled on said frame, the axes of said pulley frame and pulley lying in the same plane but at right angles to each other, a pair of connected arms pivoted at their inner ends upon the shaft of said pulley, means for adjustably securing said arms to said pulley frame and a pair of guide rolls journaled on said arms and arranged at one side of said pulley and out of line with the axis of said pulley frame and engaging the side edges of the belt in advance of said pulley, whereby lateral pressure of the belt against one or the other of said guide rolls will automatically shift said pulley and pulley frame, substantially as described.

SAMUEL D. FELSING.

Witnesses:
GEORGE F. CARPENTER,
JOHN J. FLYNN.